United States Patent
Cai et al.

(10) Patent No.: US 10,036,331 B2
(45) Date of Patent: Jul. 31, 2018

(54) LOAD ESTIMATION FOR A TWIN-ENGINE HELICOPTER

(71) Applicant: United Technologies Corporation, Farmington, CT (US)

(72) Inventors: Chaohong Cai, Weatogue, CT (US); Timothy J. Crowley, Tolland, CT (US); Richard P. Meisner, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 137 days.

(21) Appl. No.: 15/263,414

(22) Filed: Sep. 13, 2016

(65) Prior Publication Data

US 2018/0073441 A1    Mar. 15, 2018

(51) Int. Cl.
*F02C 9/52* (2006.01)
*B64D 27/10* (2006.01)
*B64C 27/12* (2006.01)
*F02C 3/04* (2006.01)
*F02C 9/54* (2006.01)

(52) U.S. Cl.
CPC ............... *F02C 9/52* (2013.01); *B64C 27/12* (2013.01); *B64D 27/10* (2013.01); *F02C 3/04* (2013.01); *F02C 9/54* (2013.01); *F05D 2220/329* (2013.01)

(58) Field of Classification Search
CPC ...... F02C 9/52; F02C 9/54; F02C 3/04; B64C 27/12; B64D 27/10; F05D 2220/329
See application file for complete search history.

(56) References Cited

U.S. PATENT DOCUMENTS

| 3,963,372 | A | * | 6/1976 | McLain | B64C 27/14 416/27 |
| 5,775,090 | A | * | 7/1998 | Skarvan | F02C 9/28 60/39.282 |
| 6,422,023 | B1 | * | 7/2002 | Dudd, Jr. | F02C 7/26 60/773 |
| 8,566,000 | B2 | * | 10/2013 | Lickfold | F02C 9/32 415/15 |
| 2014/0283527 | A1 | * | 9/2014 | Ling | F02C 9/42 60/793 |
| 2016/0069277 | A1 | * | 3/2016 | Meisner | F02C 9/52 60/773 |

* cited by examiner

*Primary Examiner* — Mary D Cheung
(74) *Attorney, Agent, or Firm* — Cantor Colburn LLP

(57) ABSTRACT

A method and control system for an aircraft using a gas turbine engine is provided. The control system includes a controller that includes a load and engine control modules and communicates control signals to a plant that includes a gas generator and a rotor load, an engine estimation module that receives engine state measurements and effector feedback/command signals from the controller and communicates a power turbine torque estimate, and a load estimation module that receives signals including the power turbine torque estimate, a first power turbine speed value, a first power turbine torque value, a second power turbine speed value, a second power turbine torque value, and a rotor speed value. The load estimation module generates one or more of a power turbine speed estimate, a power turbine torque estimate, and a rotor load estimate based on the received signals.

19 Claims, 9 Drawing Sheets

LOAD ESTIMATION FOR A TWIN-ENGINE HELICOPTER

BACKGROUND

The subject matter disclosed herein generally relates to load estimation and, more particularly, to load estimation for a twin engine helicopter.

Gas turbine engines typically include a compressor section, a combustor, and a turbine section, arranged in flow series with an upstream inlet and a downstream exhaust. Initially, air flows through the compressor section where it is compressed or pressurized. The combustor then mixes and ignites the compressed air with fuel, generating hot combustion gases. These hot combustion gases are then directed from the combustor to the turbine section where power is extracted from the hot gases by causing blades of the turbine to rotate.

Gas turbine engines may include one or more spools. For example, small-scale engines may generally use a one-spool design with co-rotating compressor and turbine sections, while larger-scale engines may generally comprise a number of coaxially nested spools. The multiple spools may operate at different pressures, temperatures, spool speeds, and directions. For instance, two-spool designs may include a high pressure spool (or high spool) and a low pressure spool (or low spool). The high pressure spool may include a high pressure turbine driving a high pressure compressor, and the low pressure spool may include a low pressure turbine driving a low pressure compressor.

Turboshaft engines, a type of gas turbine engine typically used on helicopters, rotorcrafts, and power plants etc., generally include a free power turbine spool for extracting heat energy from turbine exhaust and converting it into output shaft power. The free power turbine spool may comprise a power turbine that drives an external load that is an integrated system of a main rotor, a tail rotor, a drive train, and a gear box of the helicopter. Helicopter flight maneuvers, which involve a change in collective pitch, rapidly change the load or power demand on the power turbine in various flight conditions. In particular, aggressive helicopter flight maneuver generally poses a massive design challenge to engine fuel control for rejecting rotor load disturbance in hostile environment. In order to achieve ideal handling qualities for the airframe, it is important to maintain a constant rotor speed or minimize rotor excursion (i.e. deviation from the constant rotor speed) while promptly delivering the requested change in power demand on the power turbine.

Further, rotor torsional resonance phenomena can impose a significant design challenge to engine power delivery for helicopter flight control system. The rotor resonance is caused by the coupling of natural modes of the drive train interacting with the main rotor and the tail rotor. The torque and speed measurements of power turbine are typically disturbed by rotor resonance of main rotor and tail rotor. In order to mitigate the impact of rotor torsional resonance, current control design sometimes uses a damping approach with performance compromise. Alternatively, another method includes taking advantages of all available sensor measurements of engine and aircraft for accurately estimating the engine output shaft power disturbed by rotor resonance so as to improve flight control quality at various power levels.

Accordingly, there exists a need for an engine control system that can not only accurately estimate engine output shaft power but also promptly match the change in power demand while maintaining a constant rotor speed and abating the impact of rotor resonance.

BRIEF DESCRIPTION

According to one embodiment a control system for an aircraft using at least one gas turbine engine is provided. The control system including a controller that includes a load control module and an engine control module and is configured to communicate control signals to a plant, the plant including a gas generator and a rotor load, an engine estimation module configured to receive engine state measurements from the plant and effector feedback/command signals from the controller and communicate a power turbine torque (QPT_SVM) estimate to the controller, and a load estimation module that is configured to receive one or more signals including one or more of: the QPT_SVM estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value, wherein the load estimation module is configured to generate one or more of a power turbine speed estimate (NP_est), a power turbine torque estimate (Qpt_est), and a rotor load estimate (QR_est) based on the one or more received signals.

In addition to one or more of the features described above, or as an alternative, further embodiments may include, wherein the engine state measurements includes one or more of a Speed (N) measurement, a Pressure (P) measurement, and Temperature (T) measurement.

In addition to one or more of the features described above, or as an alternative, further embodiments may include, wherein effector feedback/command signals includes one or more of a fuel (WF), stability bleed (BLD) schedule, and inlet guide vane (IGV) schedules.

In addition to one or more of the features described above, or as an alternative, further embodiments may include, wherein the load estimation module is configured to provide the power turbine speed estimate (NP_est) to the load control module.

In addition to one or more of the features described above, or as an alternative, further embodiments may include, wherein the load estimation module is configured to provide the power turbine torque estimate (Qpt_est) to the engine control module.

In addition to one or more of the features described above, or as an alternative, further embodiments may include, wherein the load estimation module includes a power turbine speed (NP) estimation module.

In addition to one or more of the features described above, or as an alternative, further embodiments may include, wherein the power turbine speed (NP) estimation module includes input ports configured to receive the NR_sig, NP_sigR, and NP_sig, a calculation module configured to sum the NP_sigR and NP_sig values, divide the summed value by two, subtract the NR_sig from the summed and divided value generating an intermediate value, a low-pass filter $G1(s)$ configured to filter the intermediate value, the calculation module is configured to sum the NR_sig back into the output from the low-pass filter generating a second intermediate value, and one or more notch filters configured to filter the output from a second low-pass filter providing a power turbine speed estimate (NP_est) output.

In addition to one or more of the features described above, or as an alternative, further embodiments may include, wherein the load estimation module includes a power turbine torque (QPT) estimation module.

In addition to one or more of the features described above, or as an alternative, further embodiments may include, wherein the power turbine torque (QPT) estimation module includes input ports that receive the QPT_sig, NP_est from the NP estimation module, and the QPT_svm, a low-pass filter and one or more notch filters that filter the QPT_sig, a calculation module configured to processes the NP_est, subtracts the processed NP_est value from the filtered QPT_sig, and subtracts the QPT_svm creating an intermediate signal, a second low-pass filter that filter the intermediate signal, and the calculation module that adds the QPT_svm signal back into the filtered intermediate signal creating the QPT_est that is output from the QPT estimation module.

In addition to one or more of the features described above, or as an alternative, further embodiments may include, wherein the load estimation module includes a rotor load estimation module.

In addition to one or more of the features described above, or as an alternative, further embodiments may include, wherein the rotor load estimation module includes input ports configured to receive the QPT_estR, QPT_est, and NP_est, a collective pitch signal (CLA), and flight conditions, a calculation module configured to sum QPT_estR together with QPT_est, processing NP_est, and then subtract the processed NP_est from the summed value creating a first intermediate value, a rotor load model configured to receive NP_est, the collective pitch signal (CLA), and the flight conditions and generates an output value (QR_pre) based on the input collective pitch signal (CLA), NP_est, and flight conditions, the calculation module is further configured to subtract the QR_pre value from the first intermediate value creating a second intermediate value, a low-pass filter G(s) configured to filter the second intermediate value, and the calculation module is additionally configured to sum the QR_pre value back into the filtered second intermediate value creating a rotor load estimate (QR_est) that is output from the rotor load estimation module.

According to one embodiment a computer implemented method for an aircraft to calculate rotor load estimation is provided. The method including receiving, by a processor of a load estimation module, one or more signals including one or more of: a power turbine torque (QPT_SVM) estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value, generating, using the processor of the load estimation module, one or more of a power turbine speed estimate (NP_est), a power turbine torque estimate (Qpt_est), and a rotor load estimate (QR_est) based on the one or more received signals, and transmitting one or more of the NP_est, Qpt_est, and QR_est.

In addition to one or more of the features described above, or as an alternative, further embodiments may include, wherein generating the one or more of NP_est, Qpt_est, and QR_est further includes receiving, at input ports of a power turbine speed (NP) estimation module, the NR_sig, NP_sigR, and NP_sig, calculating using a calculation module an intermediate signal, wherein the calculation module sums the NP_sigR and NP_sig values, divides the summed value by two, subtracts the NR_sig from the summed and divided value generating the intermediate value, filtering, using a low-pass filter G1(s), the intermediate value, calculating using the calculation module a second intermediate signal, wherein the calculation module sums the NR_sig back into the output from the low-pass filter generating the second intermediate value, filtering, using a second low-pass filter, the second intermediate value, and filtering, using one or more notch filters, the output from the second low-pass filter generating a power turbine speed estimate (NP_est) output.

In addition to one or more of the features described above, or as an alternative, further embodiments may include, wherein generating the one or more of NP_est, Qpt_est, and QR_est further includes receiving, at input ports of the power turbine torque (QPT) estimation module, the QPT_sig, NP_est from the NP estimation module, and the QPT_svm, filtering, using a low-pass filter and, one or more notch filters, the QPT_sig, calculating using a calculation module an intermediate signal, wherein the calculation module processes the NP_est, subtracts the processed NP_est value from the filtered QPT_sig, and subtracts the QPT_svm creating the intermediate signal, filtering, using a second low-pass filter, the intermediate signal, and calculating QPT_est, using the calculation module, wherein the calculation module adds the QPT_svm signal back into the filtered intermediate signal creating the QPT_est that is output from the QPT estimation module.

In addition to one or more of the features described above, or as an alternative, further embodiments may include, wherein generating the one or more of NP_est, Qpt_est, and QR_est further includes receiving, at input ports of the rotor load estimation module, the QPT_estR, QPT_est, NP_est, a collective pitch signal (CLA), and flight conditions, calculating using a calculation module a first intermediate value, wherein the calculation module sums QPT_estR together with QPT_est, processing NP_est, and then the processed NP_est is subtracted from the summed value creating the first intermediate value, receiving at a rotor load model the NP_est, the collective pitch signal (CLA), and the flight conditions, generating at the rotor load model an output value (QR_pre) based on the input collective pitch signal (CLA), NP_est, and flight conditions, calculating a second intermediate value using the calculation module, wherein the calculation module subtracts the QR_pre value from the first intermediate value creating the second intermediate value, filtering, using a low-pass filter G(s), the second intermediate value, and generating a rotor load estimate (QR_est), wherein the calculation module sums the QR_pre value back into the filtered second intermediate value creating the rotor load estimate (QR_est) that is output from the rotor load estimation module.

According to one embodiment a computer program product for an aircraft to calculate rotor load estimation is provided. The computer program product including a computer readable storage medium having program instructions embodied therewith, the program instructions executable by one or more processors to cause the processors to receive, by a processor of a load estimation module, one or more signals including one or more of a power turbine torque (QPT_SVM) estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value, generate, using the processor of the load estimation module, one or more of a power turbine speed estimate (NP_est), a power turbine torque estimate (Qpt_est), and a rotor load estimate (QR_est) based on the one or more received signals, and transmit one or more of the NP_est, Qpt_est, and QR_est.

In addition to one or more of the features described above, or as an alternative, further embodiments may include, wherein the computer program product including additional program instructions executable by the one or more processors to cause the processors to receive, at input ports of a power turbine speed (NP) estimation module, the NR_sig, NP_sigR, and NP_sig, calculate using a calculation module an intermediate signal, wherein the calculation module sums the NP_sigR and NP_sig values, divides the summed value by two, subtracts the NR_sig from the summed and divided value generating the intermediate value, filter, using a low-pass filter $G1(s)$, the intermediate value, calculate using the calculation module a second intermediate signal, wherein the calculation module sums the NR_sig back into the output from the low-pass filter generating the second intermediate value, filter, using a second low-pass filter, the second intermediate value, and filter, using one or more notch filters, the output from the second low-pass filter generating a power turbine speed estimate (NP_est) output.

In addition to one or more of the features described above, or as an alternative, further embodiments may include, wherein the computer program product including additional program instructions executable by the one or more processors to cause the processors to receive, at input ports of the power turbine torque (QPT) estimation module, the QPT_sig, NP_est from the NP estimation module, and the QPT_svm, filter, using a low-pass filter and, one or more notch filters, the QPT_sig, calculating using a calculation module an intermediate signal, wherein the calculation module processes the NP_est, subtracts the processed NP_est value from the filtered QPT_sig, and subtracts the QPT_svm creating the intermediate signal, filter, using a second low-pass filter, the intermediate signal, and calculate QPT_est, using the calculation module, wherein the calculation module adds the QPT_svm signal back into the filtered intermediate signal creating the QPT_est that is output from the QPT estimation module.

In addition to one or more of the features described above, or as an alternative, further embodiments may include, wherein the computer program product including additional program instructions executable by the one or more processors to cause the processors to receive, at input ports of the rotor load estimation module, the QPT_estR, QPT_est, NP_est, a collective pitch signal (CLA), and flight conditions, calculate using a calculation module a first intermediate value, wherein the calculation module sums QPT_estR together with QPT_est, processing NP_est, and then the processed NP_est is subtracted from the summed value creating the first intermediate value, receive at a rotor load model the NP_est, the collective pitch signal (CLA), and the flight conditions, generate at the rotor load model an output value (QR_pre) based on the input collective pitch signal (CLA), NP_est, and flight conditions, calculating a second intermediate value using the calculation module, wherein the calculation module subtracts the QR_pre value from the first intermediate value creating the second intermediate value, filter, using a low-pass filter $G(s)$, the second intermediate value, and generate a rotor load estimate (QR_est), wherein the calculation module sums the QR_pre value back into the filtered second intermediate value creating the rotor load estimate (QR_est) that is output from the rotor load estimation module.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

One or more embodiments include a system and method of estimating power turbine speed and torque and rotor load power for a turboshaft engine in a twin-engine powered helicopter. According to one or more embodiments, the speed estimation of power turbine can use a sensor fusion algorithm to integrate the physical measurements of local engine and remote engine, and also the main rotor speed. In one or more embodiments, the torque estimation of power turbine uses a sensor-model information fusion algorithm to integrate the model-based estimation of gas generator and the physical measurements of local engine.

Further, according to one or more embodiments, the estimated speed and torques of local and remote power turbines are integrated together for estimating torque/power for the rotor load. In doing so, the majority of resonance modes can be removed within control loop bandwidth of interest, and the closed loop thus can achieve the required bandwidth and robustness without as much compromise previously provided.

Figure 1:
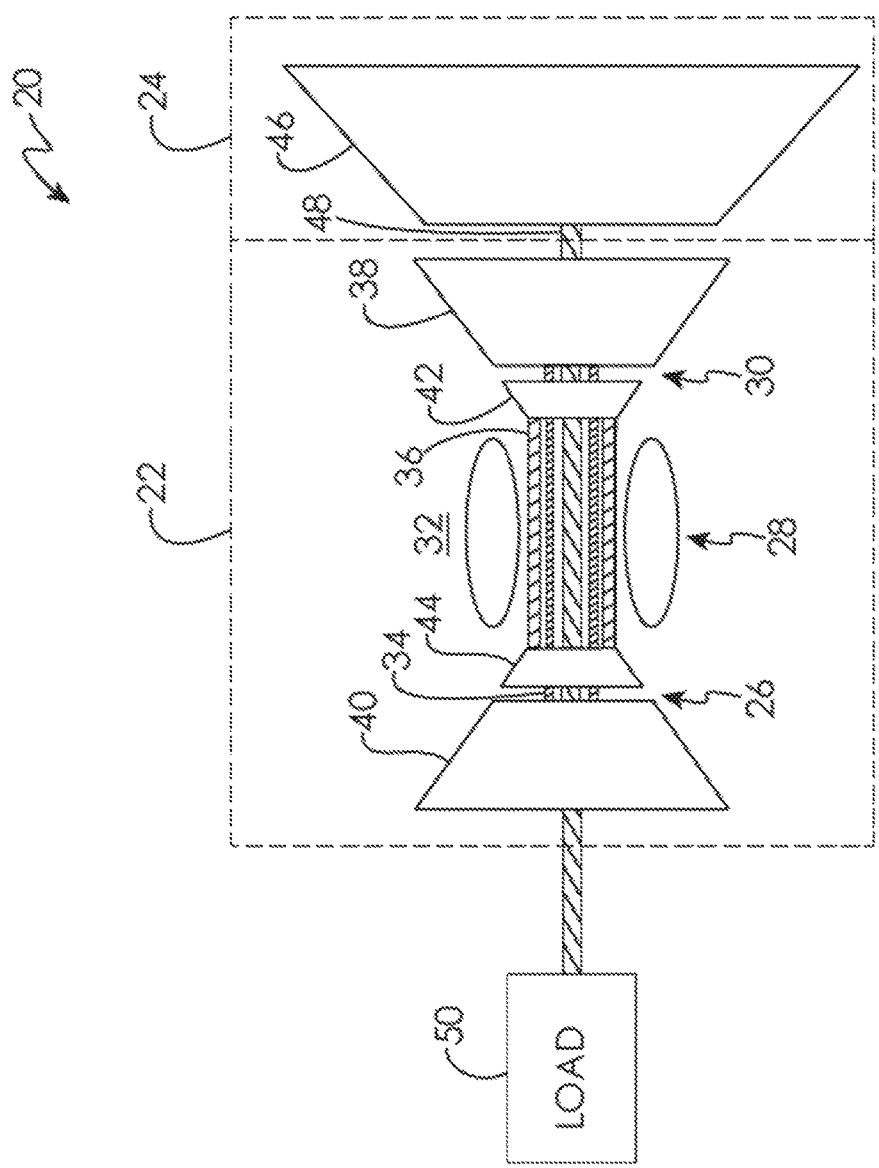
FIG. 1 is a schematic representation of a gas turbine turboshaft engine in accordance with one or more embodiments of the present disclosure.

Referring now to the drawings and with specific reference to FIG. 1, in accordance with the teachings of the disclosure, an exemplary gas turbine turboshaft engine 20 is shown. In this example, the gas turbine engine 20 is a turboshaft engine, although other types of gas turbine engines are certainly applicable to this disclosure. The gas turbine engine 20 may be used on an aircraft for generating thrust or power, on a rotorcraft for generating output shaft power, or in land-based operations for generating power as well.

The gas turbine engine 20 may generally comprise a gas generator section 22 and a power turbine section 24. The gas generator section 22 may include a compressor section 26 where air is pressurized, a combustor 28 downstream of the compressor section which mixes and ignites the compressed air with fuel and thereby generates hot combustion gases, a turbine section 30 downstream of the combustor 28 for extracting power from the hot combustion gases, and an annular flow path 32 extending axially through each.

The gas generator section 22 may comprise a single-spool configuration or a two spool configuration. In this example, the gas generator section 22 comprises a two-spool configuration, particularly, a low spool 34 and a high spool 36. Mounted to the low spool 34 is a low pressure turbine 38 which drives a low pressure compressor 40. Mounted to the high spool 36 is a high pressure turbine 42 which drives a high pressure compressor 44. More or less than two spools may be used in the gas generator section 22. The power turbine section 24 of the gas turbine engine 20 comprises a power turbine 46 mounted to a power turbine spool 48. The gas generator section 22 generates combustion gas that imparts torque to the power turbine spool 48 through the power turbine 46. The power turbine spool 48 may drive a load 50, such as, without limitation, a rotor, a turbo-pump, an electrical generator, a propeller, or other load. Although not shown, a gear box may multiply the torque or power from the power turbine spool 48 to the load 50.

According to one or more embodiments, in a twin-engine powered helicopter at least two gas turbine engines can be included that are used to drive the rotors and other elements of the rotorcraft.

Figure 2:
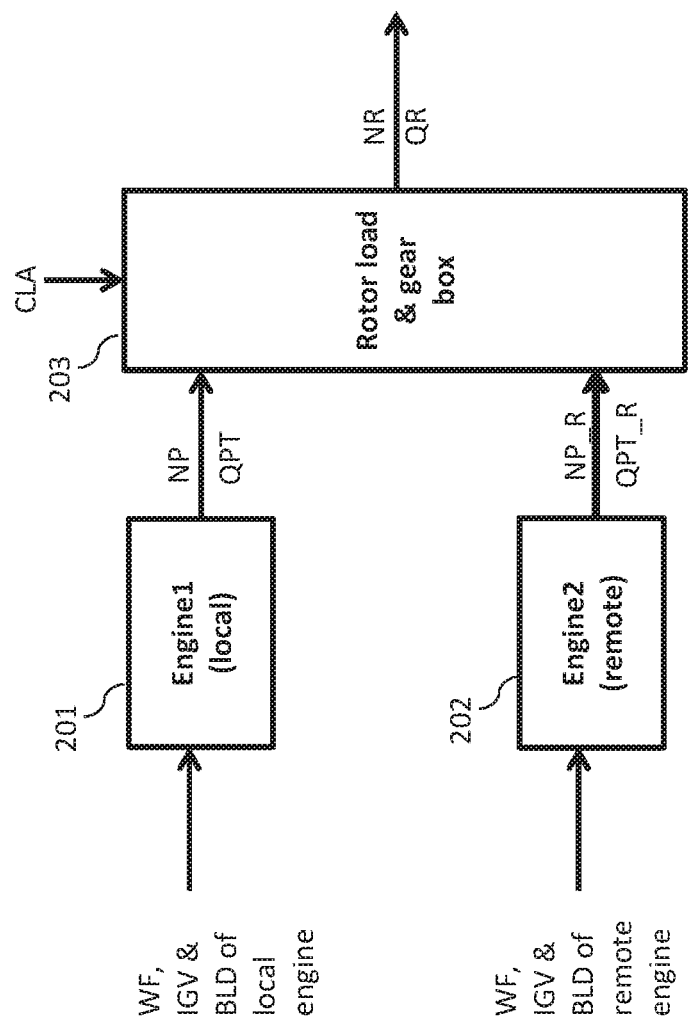
FIG. 2 is a schematic representation of a twin-engine powered rotorcraft in accordance with one or more embodiments of the present disclosure.

For example, FIG. 2 shows a block diagram of a two-engine embodiment. Particularly, the rotorcraft includes a first engine 201 that is locally placed with relation to the rotor load and gear box 203. The rotorcraft also includes the second engine 202 that is remotely located with regard to the rotor load and gear box. As shown, each engine is provided with a fuel (WF), stability bleed (BLD) schedule, and inlet guide vane (IGV) schedules. The first engine 201 can then provide a first power turbine speed (NP) and a first power turbine torque (QPT) to the rotor load and gear box 203. Similarly, the second engine 202 can provide a second power turbine speed (NP_R) and a second power turbine torque (QPT_R) to the rotor load and gear box 203. Using a collective lever angle command (CLA) as well as the first power turbine speed (NP), the first power turbine torque (QPT), the second power turbine speed (NP_R), and the second power turbine torque (QPT_R) the rotor load and gear box 203 generates and provides a particular rotor speed (NR) and a rotor load torque (QR). All of these values are carefully monitored and controlled by a control system as described below to provide control of the rotorcraft during operation. Further, the control system can also include estimation components that can estimate values that can be used to more accurately adjust and provide control of the rotorcraft as described in one or more embodiments herewith.

Figure 3:
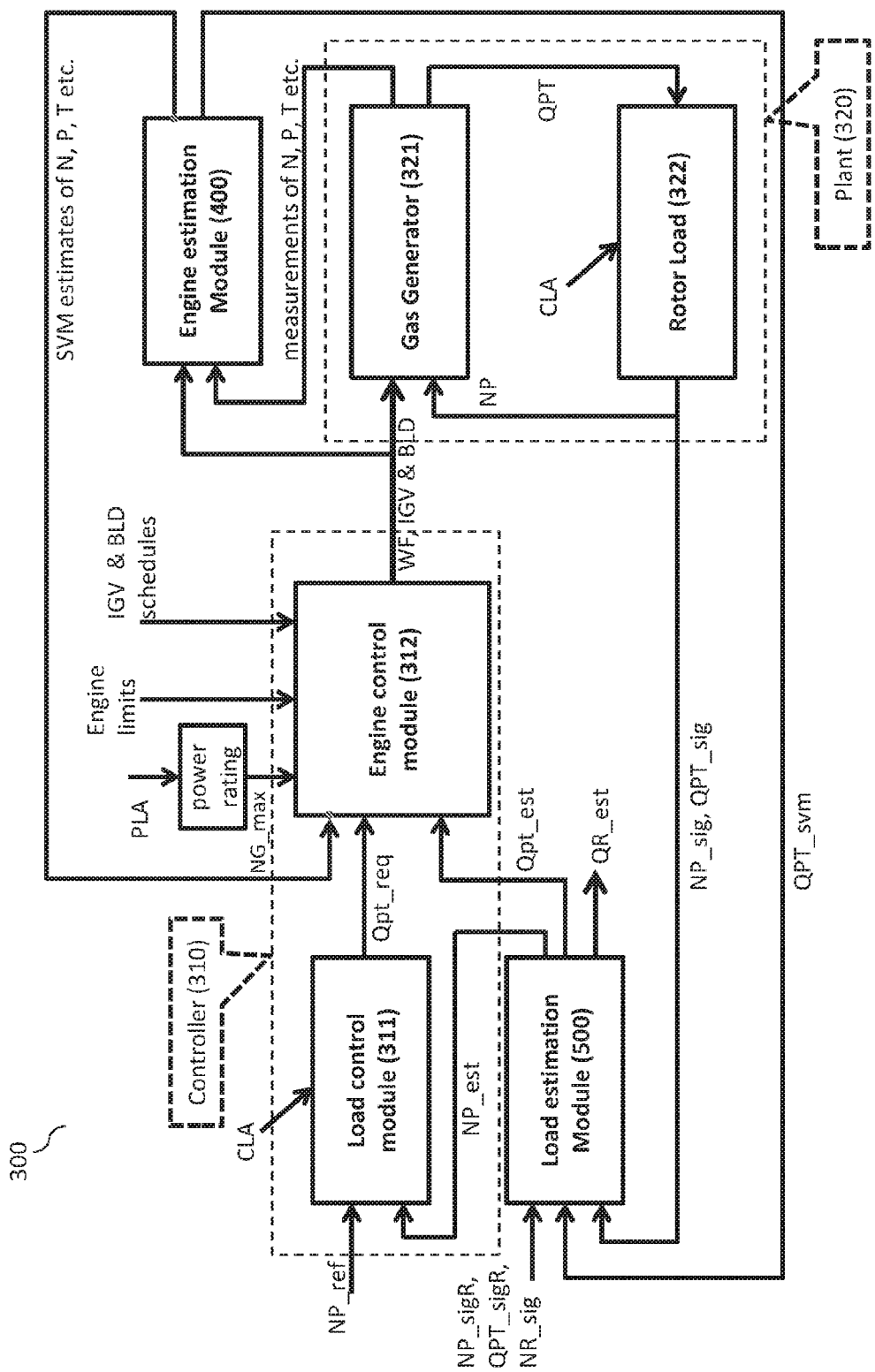
FIG. 3 is a schematic representation of a control system for one or more gas turbine engines in accordance with one or more embodiments of the present disclosure.

For example, FIG. 3 is a schematic representation of a control system 300 for use with one or more gas turbine engines. The control system 300 includes a controller 310 that is connected to a power plant that includes a gas generator and a rotor load that is configured to drive an aircraft rotor, which is also referred to throughout as a plant 320 as well an engine estimation module 400 and a load estimation module 500 that receive signals from a variety of elements and provide values to the controller 310. Specifically, the controller is communicatively connected to the plant 320 so that is can provide control signals to the plant 320 for controlling the plant 320. Further, as shown the controller 310 can include a load control module 311 and an engine control module 312 that are each configured to receive the corresponding values as shown and generate control signals accordingly. The plant 320 in turn drives a rotor load and powers a helicopter in flight. The plant 320 further includes a gas generator 321 and a rotor load element 322 that receive and provide outputs accordingly.

Further, in accordance with one or more embodiments, the engine estimation module 400 is configured to receive measurements from the plant 320 and signals from the controller 310 that are used to generate an engine state and output estimation that is provided back to the controller 310 for use in generating more accurate control signals. Further, the load estimation module 500 receives values from the plant 320 in addition to information from the one or more gas turbine engines and provides estimated values to the controller 310 for use in generating more accurate control signals as well.

Specifically, the load estimation module 500 receives at least a second power turbine speed (NP_sigR) value, a second power turbine torque (QPT_sigR) value, a particular rotor speed (NR_sig) value. Further, the load estimation module 500 also receives a state variable model power turbine torque value (QPT_svm) from the engine estimation module 400. The load estimation module also receives a first power turbine speed (NP_sig) value and a first power turbine torque (QPT_sig) value from the plant 320. With all these inputs, the load estimation module can generate at least a power turbine speed estimate (NP_est), a power turbine torque estimate (Qpt_est), and a rotor load estimate (QR_est). As shown the NP_est can be provided to the load control module 311 of the controller 310 and the Qpt_est can be provided to the engine control module 312 of the controller 310.

Further, the engine estimation module 400 receives WF, IGV, and BLD values from the controller 310 as well as measurements of engine state variables, for example, Speed (N), Pressure (P), Temperature (T), etc. from the plant 320. The engine estimation module 400 uses these variables values and calculates SVM estimates of the N, P, T etc. and the unmeasured outputs like torque and power by using an estimation algorithm. These estimated values are provided to the engine control module 312 of the controller 310 and shown. Further, according to a specific embodiment, the engine estimation module 400 can receive engine state measurements (e.g. N, P, T etc.) and effector feedback/command signals (e.g. WF, IGV, BLD etc.) and can use a Kalman-filter like estimation approach to estimate the torque of power turbine (i.e. QPT_SVM) and other unmeasured signals for the gas generator (N, P, T estimate etc.).

Figure 4:
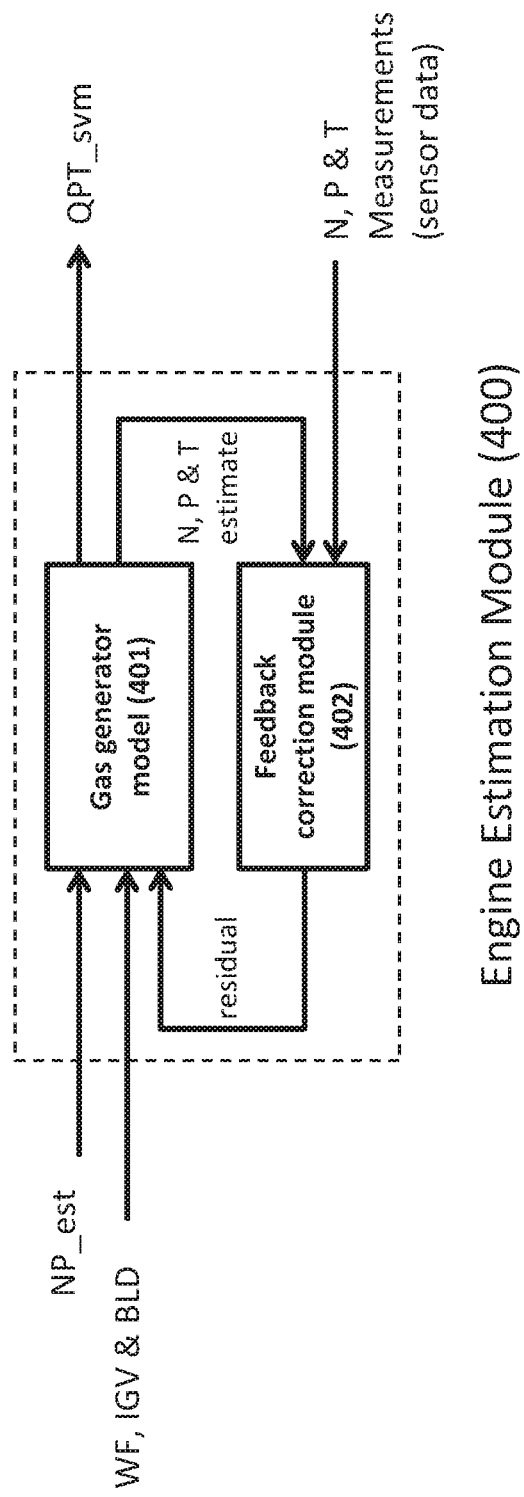
FIG. 4 is a schematic representation of a an engine estimate module in accordance with one or more embodiments of the present disclosure.

Looking now at FIG. 4, in accordance with one or more embodiments, an engine estimate module 400 is shown.

According to an embodiment, the engine estimate module 400 is implemented as a software model that is executed by a processor. The processor can be a dedicated processor that is used only for processing engine estimation values for the engine estimate module 400. Alternatively, the engine estimate module 400 can share a processor that also provides processing to one or more other modules such as, for example, the engine control module 312, the load control module 311, and/or the load estimation module 500. Further, according to another example, joint processor can be located in the system controller 310. Alternatively, each module can have its own processor or set of processors depending on the processing needs of each. Further, the engine estimate module 400 may further include one or more sensors that provide values that can be used for calculating values when using the engine estimate module 400.

The engine estimation module 400 includes a gas generator model 401 and a feedback correction module 402. The feedback correction module 402 receives the sensor data measurements as well as the estimate values from the gas generator model 401 and provides the residual to the gas generator model 401 that uses it when calculating the QPT_svm value. The gas generator model 401 also receives NP_est and WF, IGV, and BLD values that are used to calculate the QPT_svm that is output from the engine estimation module 400 as shown. According to one or more embodiments, the feedback correction module 402 can be implemented using software, hardware, or a combination thereof. For example, the feedback correction module can include some purpose built circuit elements that can include, for example filters and arithmetic units that process the received estimate values and the sensor data measurements into the residual output signal that is provided to the gas generator model 401. Alternatively, according to another embodiment, the feedback correction module 402 can include a general purpose processor and access to a local and/or off-site program storage element that contains software instructions that instruct the general purpose processor on how to take the received estimate values and the sensor data measurements and provided the residual output.

Figure 5:
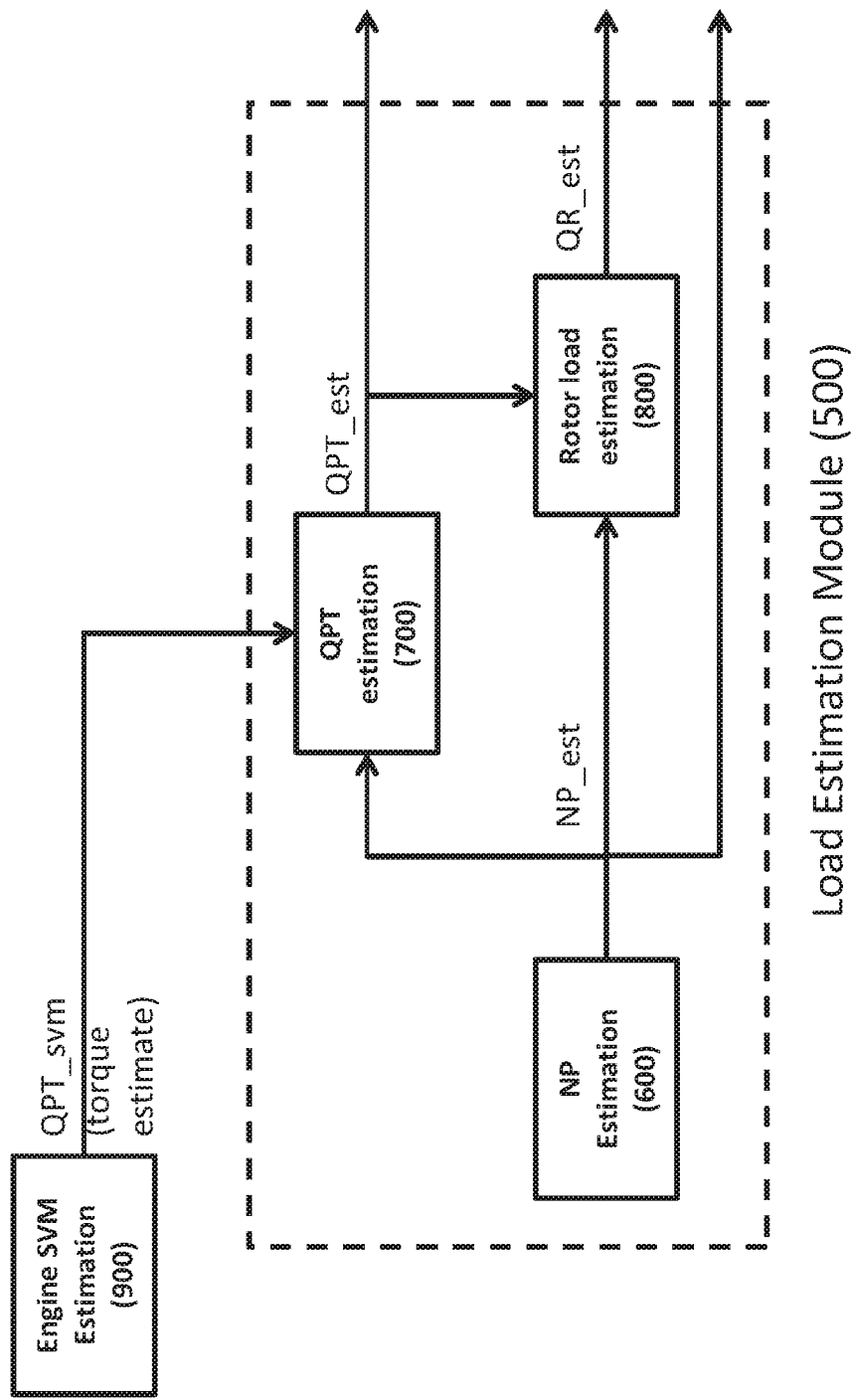
FIG. 5 is a schematic representation of a load estimation module in accordance with one or more embodiments of the present disclosure.

Looking now at FIG. 5, in accordance with one or more embodiments, a load estimation module 500 is shown. The load estimation module 500 includes an NP estimation element 600, a QPT estimation element 700, and a rotor load estimation element 800. The QPT estimation element 700 of the load estimation module 500 receives at least the QPT_svm torque estimate from the engine estimate module 900. Further, the NP estimation element 600 provides an NP_est to the rotor load estimation element 800 and the QPT estimation element 700 provides a QPT_est to the rotor load estimation element 800. The rotor load estimation element 800 in turn calculates a QR_est that is output from the load estimation module 500.

Figure 6:
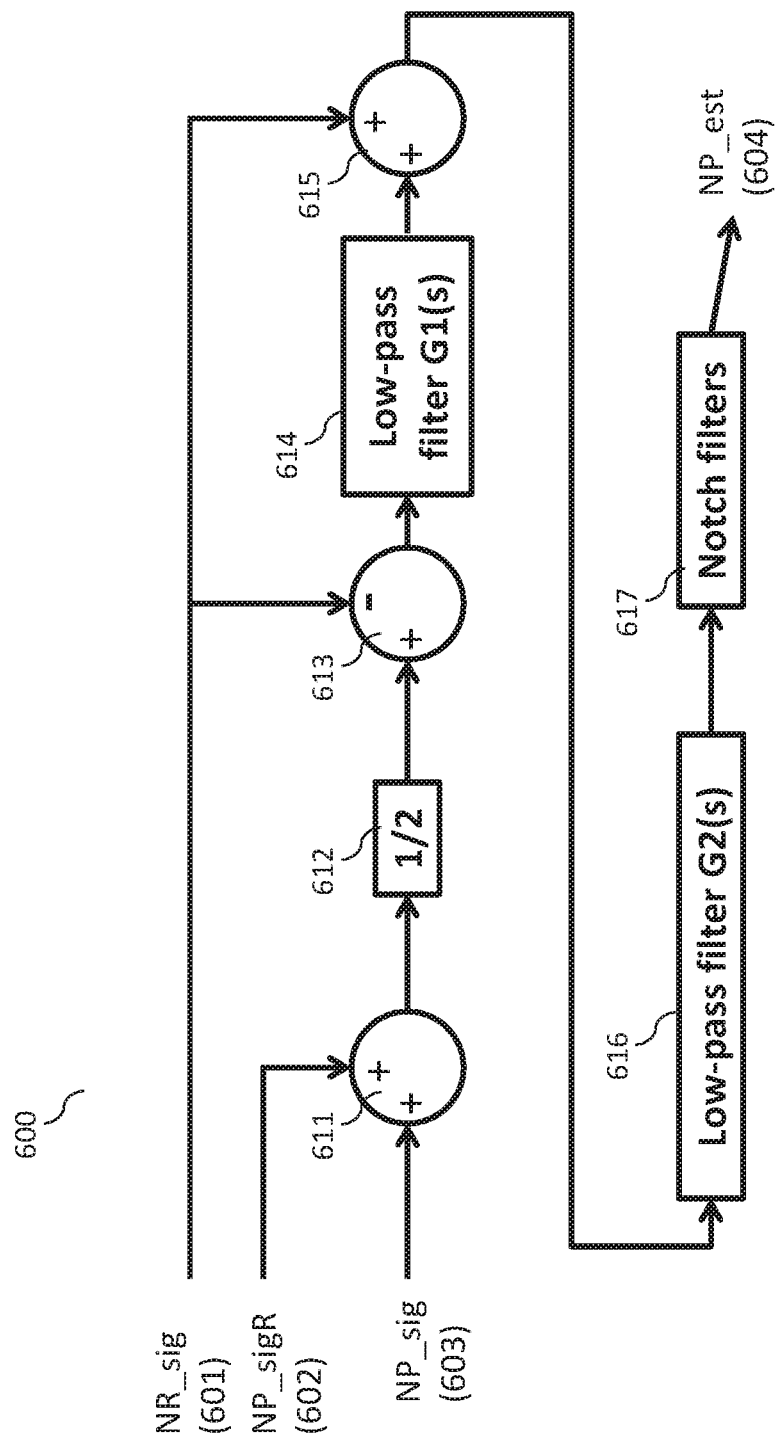
FIG. 6 is a schematic representation of a NP estimation element in accordance with one or more embodiments of the present disclosure.

Particularly, FIG. 6 is a schematic representation of an NP estimation element 600 in accordance with one or more embodiments. As shown, the NP estimation element 600 receives NR_sig 601, NP_sigR 602, and NP_sig 603. The NP estimation element 600 then sums 611 the NP_sigR 602 and NP_sig 603 values, divides 612 that sum by two, and then subtracts 613 the NR_sig 601 from that value. A low-pass filter $G1(s)$ 614 then filters that signal and the NR_sig 601 is summed 615 back into the value that is again run through another low-pass filter $G2(s)$ 616. Finally, the signal is filtered using one or more notch filters 617 providing the output of the power turbine speed estimate NP_est 604.

According to another embodiments, the NP estimation submodule 600 receives the speed measurements of main rotor (i.e. NR_sig), power turbine of local engine (i.e. NP_sig), and power turbine of remote engine (i.e. NP_sigR) so as to estimate the power turbine speed of local engine by using a combination of complementary filter, low-pass filter, and notch filters.

Figure 7:
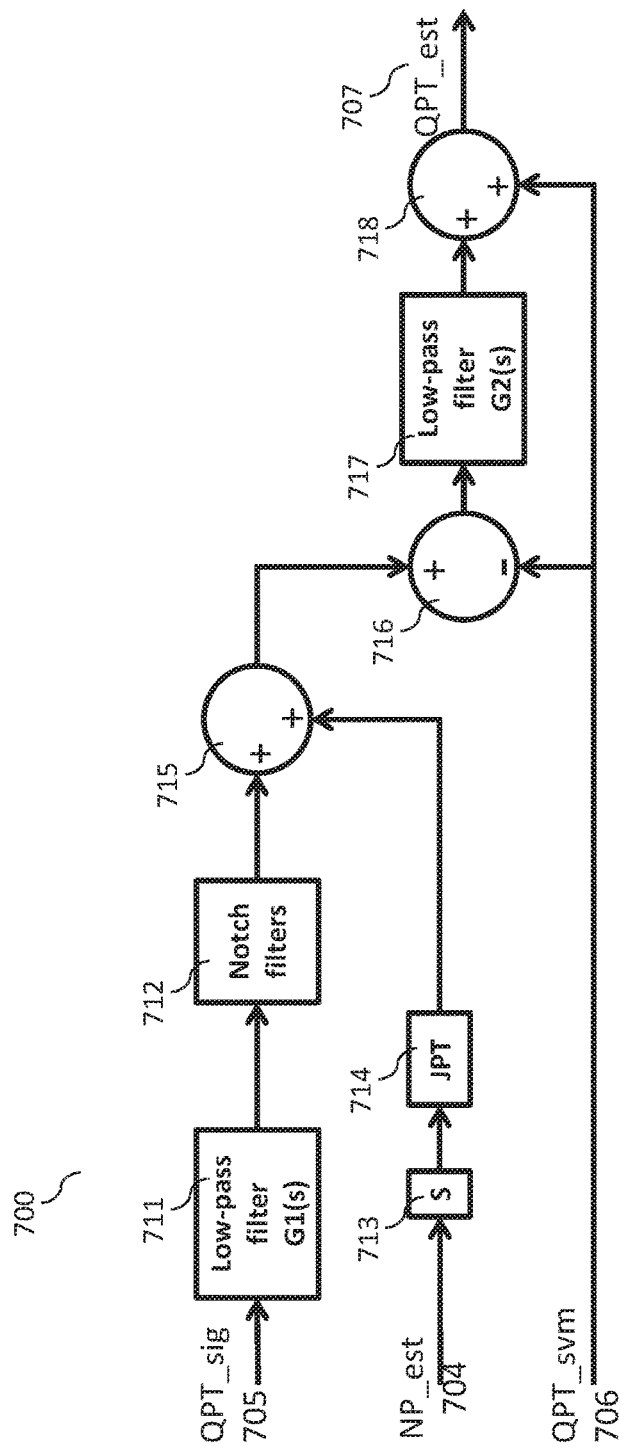
FIG. 7 is a schematic representation of a QPT estimation element in accordance with one or more embodiments of the present disclosure.

FIG. 7 is a schematic representation of a QPT estimation element 700 in accordance with one or more embodiments. The QPT estimation element 700 receives a QPT_sig 705, NP_est 704 from the MP estimation element, and a QPT_svm 706 signals. The QPT estimation element 700 passes the QPT_sig 705 signal through a low-pass filter $G1(s)$ 711 and a one or more notch filters 712. The QPT estimation element 700 also processes the NP_est 704 as shown in parallel 713 and 714. The QPT estimation element 700 then adds 715 the processed NP_est 704 value from the filtered QPT_sig 705 and then also subtracts 716 the QPT_svm 706. The remaining signal is passed through another low-pass filter $G2(s)$ 717 and then the QPT_svm 706 signal is added back creating the final QPT_est 707 value. This power turbine torque value estimate (QPT_est 707) is then output from the QPT estimation element 700.

According to another embodiment, the QPT estimation element 700 receives the estimated torque signal from the engine estimation module 400 (i.e. QPT_SVM), the estimated power turbine speed signal (i.e. NP_est), the physical measurements of power turbine torque of local engine (i.e. QPT_sig) and uses those values to estimate the power turbine torque of local engine (i.e. QPT_est).

Figure 8:
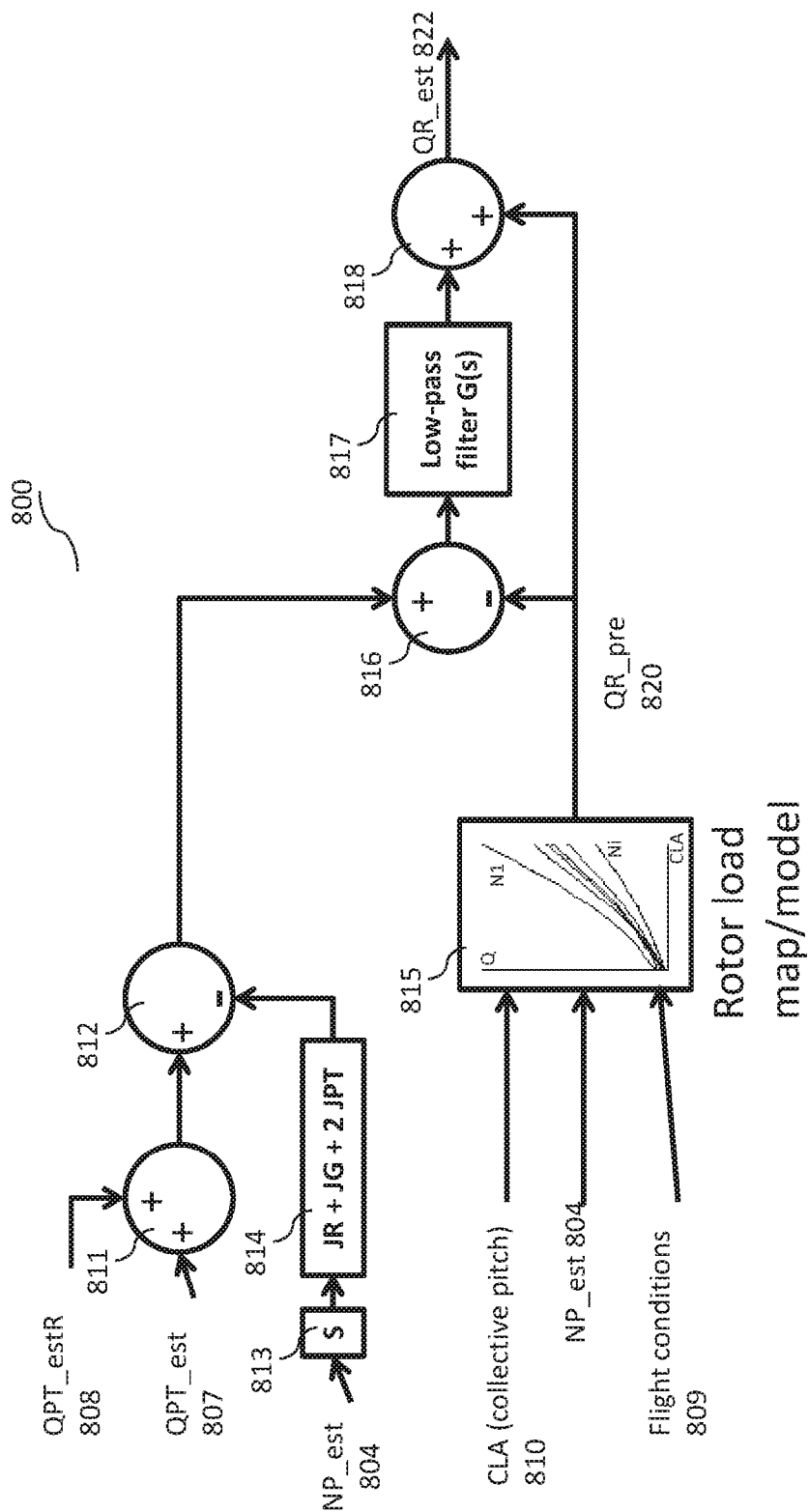
FIG. 8 is a schematic representation of a rotor load estimation element in accordance with one or more embodiments of the present disclosure.

FIG. 8 is a schematic representation of a rotor load estimation element 800. The rotor load estimation element 800 receives the QPT_estR 808, QPT_est 807, and NP_est 804. The QPT_estR 808 is summed 812 together with QPT_est 807 value and then the NP_est 804 value is processed 813 and 814 and subtracted 812 from the summed value as shown creating a first intermediate value. The rotor load estimation element 800 also receives a collective pitch signal (CLA) 810, NP_est 804, and flight conditions 809 that are provided to a rotor load model 815 that is included in the rotor load estimation element 800. This rotor load model 815 generates an output value (QR_pre 820) based on the input collective pitch signal (CLA) 810, NP_est 804, and flight conditions 809. The QR_pre 820 value is subtracted 816 from the first intermediate value calculated above. The remaining signal is passed through a low-pass filter $G(s)$ 817 and then the QR_pre 820 value is summed 818 back in to create a final rotor load estimate (QR_est 822) value that is output from the overall rotor load estimation element 800.

According to another embodiment, the rotor load estimation element 800 receives the estimated torque signals from local engine and remote engine (QPT_est and QPT_estR), the estimated NP_est, and the predicted load from a map or model of rotor load (QR_pre) so as to estimate the torque/power of the rotor load.

Figure 9:
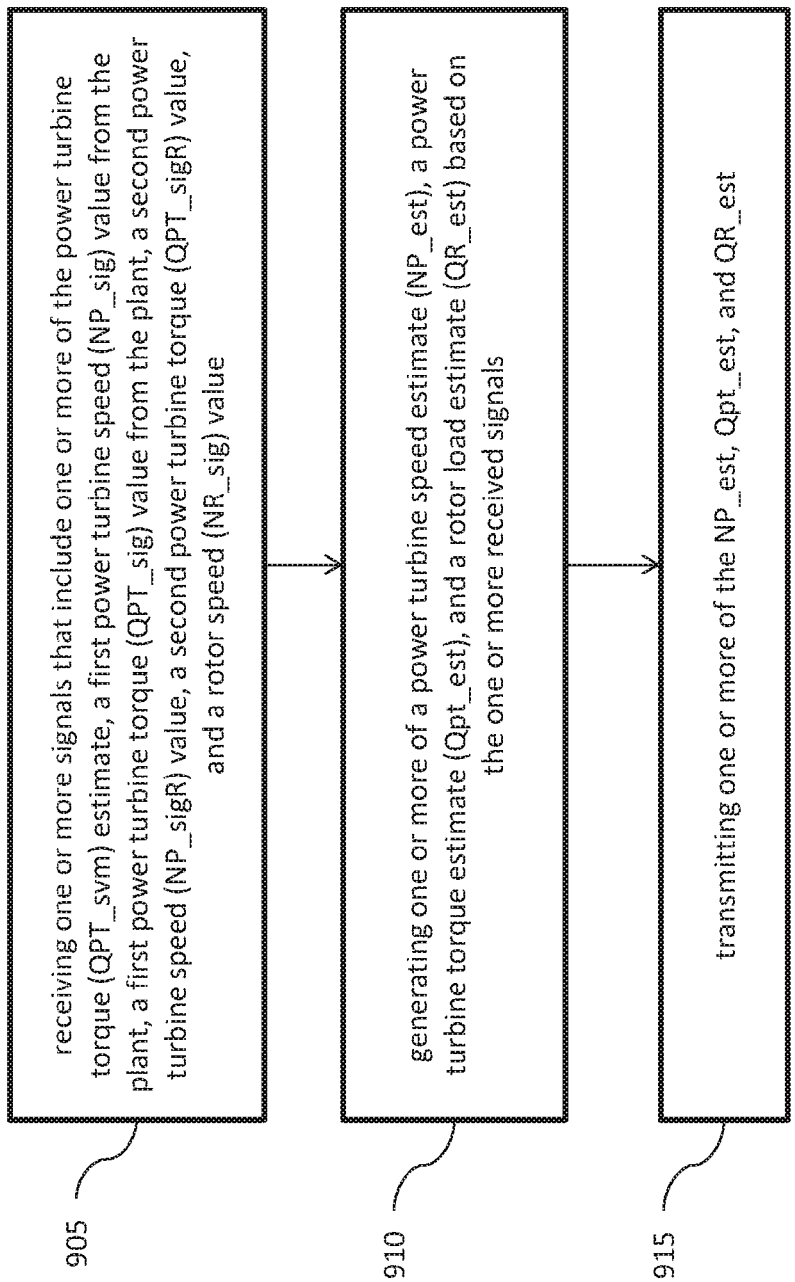
FIG. 9 is a flowchart of a method of providing load estimation for a twin-engine rotorcraft in accordance with one or more embodiments of the present disclosure.

FIG. 9 is a flowchart of a method 900 of providing load estimation for a twin-engine rotorcraft in accordance with one or more embodiments. The method 900 includes receiving one or more signals that include one or more of the power turbine torque (QPT_svm) estimate, a first power turbine speed (NP_sig) value from the plant, a first power turbine torque (QPT_sig) value from the plant, a second power turbine speed (NP_sigR) value, a second power turbine torque (QPT_sigR) value, and a rotor speed (NR_sig) value (operation 905). The method 900 also includes generating one or more of a power turbine speed estimate (NP_est), a power turbine torque estimate (Qpt_est), and a rotor load estimate (QR_est) based on the one or more received signals (operation 910). Further, the method 900 includes transmitting one or more of the NP_est, Qpt_est, and QR_est (operation 915).

According to another embodiment, the method 900 further includes receiving, at input ports of a power turbine speed (NP) estimation module, the NR_sig, NP_sigR, and NP_sig. The method can also include calculating using a calculation module an intermediate signal, wherein the calculation module sums the NP_sigR and NP_sig values, divides the summed value by two, subtracts the NR_sig from the summed and divided value generating the intermediate value. Also included is filtering, using a low-pass filter $G1(s)$, the intermediate value and calculating using the calculation module a second intermediate signal, wherein the calculation module sums the NR_sig back into the output from the low-pass filter generating the second intermediate value. Further, the method can include filtering, using a second low-pass filter, the second intermediate value, and filtering, using one or more notch filters, the output from the second low-pass filter generating a power turbine speed estimate (NP_est) output.

According to another embodiment, the method 900 further includes receiving, at input ports of the power turbine torque (QPT) estimation module, the QPT_sig, NP_est from the NP estimation module, and the QPT_svm and filtering, using a low-pass filter and, one or more notch filters, the QPT_sig. The method also includes calculating using a calculation module an intermediate signal, wherein the calculation module processes the NP_est, subtracts the processed NP_est value from the filtered QPT_sig, and subtracts the QPT_svm creating the intermediate signal and filtering, using a second low-pass filter, the intermediate signal. Further, the method can include calculating QPT_est, using the calculation module, wherein the calculation module adds the QPT_svm signal back into the filtered intermediate signal creating the QPT_est that is output from the QPT estimation module.

According to another embodiment, the method 900 further includes receiving, at input ports of the rotor load estimation module, the QPT_estR, QPT_est, NP_est, a collective pitch signal (CLA), and flight conditions and calculating using a calculation module a first intermediate value, wherein the calculation module sums QPT_estR together with QPT_est; processing NP_est, and then the processed NP_est is subtracted from the summed value creating the first intermediate value. The method can also include receiving at a rotor load model the NP_est, the collective pitch signal (CLA), and the flight condition and generating at the rotor load model an output value (QR_pre) based on the input collective pitch signal (CLA), NP_est, and flight conditions. Further, the method can include calculating a second intermediate value using the calculation module, wherein the calculation module subtracts the QR_pre value from the first intermediate value creating the second intermediate value and filtering, using a low-pass filter $G(s)$, the second intermediate value. Finally, the method can also include generating a rotor load estimate (QR_est), wherein the calculation module sums the QR_pre value back into the filtered second intermediate value creating the rotor load estimate (QR_est) that is output from the rotor load estimation module.

Advantageously, embodiments described herein provide higher bandwidth and better robustness for torque control loop of power turbine. Additionally, one or more embodiments provide smoother power delivery for AEO transient operation, and smaller rotor speed excursion during fast load changes; better flight handling quality and robust performance at various power levels; better power monitoring redundancy and situation awareness for twin-engine powered load management; and/or better monitoring of rotor load power for pilots.

Further, one or more embodiments may effectively remove rotor resonance modes for both the all engine operative (AEO) operation and the one engine inoperative (OEI) operation, and one or more embodiments may also consistently improve the control bandwidth and stability for the CMVC integration loops at various power levels.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A control system for an aircraft using at least one gas turbine engine, the control system comprising:
    a controller that includes a load control module and an engine control module and is configured to communicate control signals to a plant, the plant including a gas generator and a rotor load;
    an engine estimation module configured to receive engine state measurements from the plant and effector feedback/command signals from the controller and communicate a power turbine torque (QPT_SVM) estimate to the controller; and
    a load estimation module that is configured to receive one or more signals including one or more of: the QPT_SVM estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value,
    wherein the load estimation module is configured to generate one or more of: a power turbine speed estimate (NP_est), a power turbine torque estimate (Qpt_est), and a rotor load estimate (QR_est) based on the one or more received signals.

2. The control system of claim 1, wherein the engine state measurements includes one or more of a Speed (N) measurement, a Pressure (P) measurement, and Temperature (T) measurement.

3. The control system of claim 1, wherein effector feedback/command signals includes one or more of a fuel (WF), stability bleed (BLD) schedule, and inlet guide vane (IGV) schedules.

4. The control system of claim 1, wherein the load estimation module is configured to provide the power turbine speed estimate (NP_est) to the load control module.

5. The control system of claim 1, wherein the load estimation module is configured to provide the power turbine torque estimate (Qpt_est) to the engine control module.

6. The control system of claim 1, wherein the load estimation module comprises:
    a power turbine speed (NP) estimation module.

7. The control system of claim 6, wherein the power turbine speed (NP) estimation module comprises:
    input ports configured to receive the NR_sig, NP_sigR, and NP_sig;
    a calculation module configured to sum the NP_sigR and NP_sig values, divide the summed value by two, subtract the NR_sig from the summed and divided value generating an intermediate value;
    a low-pass filter G1($s$) that is configured to filter the intermediate value;
    the calculation module is configured to sum the NR_sig back into the output from the low-pass filter generating a second intermediate value;
    and one or more notch filters configured to filter the output from a second low-pass filter providing a power turbine speed estimate (NP_est) output.

8. The control system of claim 1, wherein the load estimation module comprises:
    an power turbine torque (QPT) estimation module.

9. The control system of claim 8, wherein the power turbine torque (QPT) estimation module comprises:
    input ports that receive the QPT_sig, NP_est from the NP estimation module, and the QPT_svm;
    a low-pass filter and one or more notch filters that filter the QPT_sig;
    a calculation module configured to processes the NP_est, subtracts the processed NP_est value from the filtered QPT_sig, and subtracts the QPT_svm creating an intermediate signal;
    a second low-pass filter that filter the intermediate signal; and
    the calculation module that adds the QPT_svm signal back into the filtered intermediate signal creating the QPT_est that is output from the QPT estimation module.

10. The control system of claim 1, wherein the load estimation module comprises:
a rotor load estimation module.

11. The control system of claim 10, wherein the rotor load estimation module comprises:
input ports configured to receive the QPT_estR, QPT_est, and NP_est, a collective pitch signal (CLA), and flight conditions;
a calculation module configured to sum QPT_estR together with QPT_est; process NP_est, and then subtract the processed NP_est from the summed value creating a first intermediate value;
a rotor load model configured to receive NP_est, the collective pitch signal (CLA), and the flight conditions and generates an output value (QR_pre) based on the input collective pitch signal (CLA), NP_est, and flight conditions;
the calculation module is further configured to subtract the QR_pre value from the first intermediate value creating a second intermediate value;
a low-pass filter G(s) configured to filter the second intermediate value; and
the calculation module is additionally configured to sum the QR_pre value back into the filtered second intermediate value creating a rotor load estimate (QR_est) that is output from the rotor load estimation module.

12. A computer implemented method for an aircraft to calculate rotor load estimation, the method comprising:
receiving, by a processor, one or more signals including one or more of: a power turbine torque (QPT_SVM) estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value;
generating, by the processor, one or more of: a power turbine speed estimate (NP_est), a power turbine torque estimate (Qpt_est), and a rotor load estimate (QR_est) based on the one or more received signals; and
transmitting one or more of the NP_est, Qpt_est, and QR_est.

13. The computer implemented method of claim 12, wherein generating the one or more of NP_est, Qpt_est, and QR_est further comprises:
receiving, at input ports of a power turbine speed (NP) estimation module, the NR_sig, NP_sigR, and NP_sig;
calculating using a calculation module an intermediate signal, wherein the calculation module sums the NP_sigR and NP_sig values, divides the summed value by two, subtracts the NR_sig from the summed and divided value generating the intermediate value;
filtering, using a low-pass filter G1(s), the intermediate value;
calculating using the calculation module a second intermediate signal, wherein the calculation module sums the NR_sig back into the output from the low-pass filter generating the second intermediate value;
filtering, using a second low-pass filter, the second intermediate value; and
filtering, using one or more notch filters, the output from the second low-pass filter generating a power turbine speed estimate (NP_est) output.

14. The computer implemented method of claim 12, wherein generating the one or more of NP_est, Qpt_est, and QR_est further comprises:
receiving, at input ports of the power turbine torque (QPT) estimation module, the QPT_sig, NP_est from the NP estimation module, and the QPT_svm;
filtering, using a low-pass filter and, one or more notch filters, the QPT_sig;
calculating using a calculation module an intermediate signal, wherein the calculation module processes the NP_est, subtracts the processed NP_est value from the filtered QPT_sig, and subtracts the QPT_svm creating the intermediate signal;
filtering, using a second low-pass filter, the intermediate signal; and
calculating QPT_est, using the calculation module, wherein the calculation module adds the QPT_svm signal back into the filtered intermediate signal creating the QPT_est that is output from the QPT estimation module.

15. The computer implemented method of claim 12, wherein generating the one or more of NP_est, Qpt_est, and QR_est further comprises:
receiving, at input ports of the rotor load estimation module, the QPT_estR, QPT_est, NP_est, a collective pitch signal (CLA), and flight conditions;
calculating using a calculation module a first intermediate value, wherein the calculation module sums QPT_estR together with QPT_est; processing NP_est, and then the processed NP_est is subtracted from the summed value creating the first intermediate value;
receiving at a rotor load model the NP_est, the collective pitch signal (CLA), and the flight conditions;
generating at the rotor load model an output value (QR_pre) based on the input collective pitch signal (CLA), NP_est, and flight conditions;
calculating a second intermediate value using the calculation module, wherein the calculation module subtracts the QR_pre value from the first intermediate value creating the second intermediate value;
filtering, using a low-pass filter G(s), the second intermediate value; and
generating a rotor load estimate (QR_est), wherein the calculation module sums the QR_pre value back into the filtered second intermediate value creating the rotor load estimate (QR_est) that is output from the rotor load estimation module.

16. A computer program product for an aircraft to calculate a rotor load estimation, the computer program product comprising a computer readable storage medium having program instructions embodied therewith, the program instructions executable by one or more processors to cause the processors to:
receive, by a processor of a load estimation module, one or more signals including one or more of a power turbine torque (QPT_SVM) estimate, a first power turbine speed (NP_sig) value, a first power turbine torque (QPT_sig) value, a second power turbine speed (NP_sigR) value, a second power turbine torque (QPT_sigR) value, and a rotor speed (NR_sig) value;
generate, using the processor of the load estimation module, one or more of a power turbine speed estimate (NP_est), a power turbine torque estimate (Qpt_est), and a rotor load estimate (QR_est) based on the one or more received signals; and
transmit one or more of the NP_est, Qpt_est, and QR_est.

17. The computer program product of claim 16, wherein the computer program product comprising additional program instructions executable by the one or more processors to cause the processors to:

receive, at input ports of a power turbine speed (NP) estimation module, the NR_sig, NP_sigR, and NP_sig;

calculate using a calculation module an intermediate signal, wherein the calculation module sums the NP_sigR and NP_sig values, divides the summed value by two, subtracts the NR_sig from the summed and divided value generating the intermediate value;

filter, using a low-pass filter G1($s$), the intermediate value;

calculate using the calculation module a second intermediate signal, wherein the calculation module sums the NR_sig back into the output from the low-pass filter generating the second intermediate value;

filter, using a second low-pass filter, the second intermediate value; and filter, using one or more notch filters, the output from the second low-pass filter generating a power turbine speed estimate (NP_est) output.

18. The computer program product of claim 16, wherein the computer program product comprising additional program instructions executable by the one or more processors to cause the processors to:

receive, at input ports of the power turbine torque (QPT) estimation module, the QPT_sig, NP_est from the NP estimation module, and the QPT_svm;

filter, using a low-pass filter and, one or more notch filters, the QPT_sig;

calculating using a calculation module an intermediate signal, wherein the calculation module processes the NP_est, subtracts the processed NP_est value from the filtered QPT_sig, and subtracts the QPT_svm creating the intermediate signal;

filter, using a second low-pass filter, the intermediate signal; and calculate QPT_est, using the calculation module, wherein the calculation module adds the QPT_svm signal back into the filtered intermediate signal creating the QPT_est that is output from the QPT estimation module.

19. The computer program product of claim 16, wherein the computer program product comprising additional program instructions executable by the one or more processors to cause the processors to:

receive, at input ports of the rotor load estimation module, the QPT_estR, QPT_est, NP_est, a collective pitch signal (CLA), and flight conditions;

calculate using a calculation module a first intermediate value, wherein the calculation module sums QPT_estR value together with QPT_est; processing NP_est, and then the processed NP_est is subtracted from the summed value creating the first intermediate value;

receive at a rotor load model the NP_est, the collective pitch signal (CLA), and the flight conditions;

generate at the rotor load model an output value (QR_pre) based on the input collective pitch signal (CLA), NP_est, and flight conditions;

calculating a second intermediate value using the calculation module, wherein the calculation module subtracts the QR_pre value from the first intermediate value creating the second intermediate value;

filter, using a low-pass filter G($s$), the second intermediate value; and generate a rotor load estimate (QR_est), wherein the calculation module sums the QR_pre value back into the filtered second intermediate value creating the rotor load estimate (QR_est) that is output from the rotor load estimation module.

* * * * *